US 12,455,718 B2

(12) United States Patent
Noguchi

(10) Patent No.: US 12,455,718 B2
(45) Date of Patent: Oct. 28, 2025

(54) INFORMATION PROCESSING DEVICE, INFORMATION PROCESSING METHOD, AND STORAGE MEDIUM

(71) Applicant: HONDA MOTOR CO., LTD., Tokyo (JP)

(72) Inventor: Takashi Noguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 187 days.

(21) Appl. No.: 18/398,884

(22) Filed: Dec. 28, 2023

(65) Prior Publication Data

US 2024/0311077 A1 Sep. 19, 2024

(30) Foreign Application Priority Data

Mar. 15, 2023 (JP) ................. 2023-040953

(51) Int. Cl.
*G06F 3/16* (2006.01)
*G06F 3/04847* (2022.01)
*G10L 25/78* (2013.01)

(52) U.S. Cl.
CPC .......... *G06F 3/165* (2013.01); *G06F 3/04847* (2013.01); *G10L 25/78* (2013.01)

(58) Field of Classification Search
None
See application file for complete search history.

(56) References Cited

U.S. PATENT DOCUMENTS

| 2007/0154046 A1* | 7/2007 | Mishan ................. H04R 1/1083 |
| | | 381/370 |
| 2021/0080270 A1* | 3/2021 | Sugita ................. G01C 21/3438 |
| 2023/0199428 A1* | 6/2023 | Mizuno ............. G10K 11/17823 |
| | | 700/94 |

FOREIGN PATENT DOCUMENTS

JP 2021-047501 A 3/2021

* cited by examiner

*Primary Examiner* — Tuan S Nguyen
(74) *Attorney, Agent, or Firm* — Rankin, Hill & Clark LLP

(57) ABSTRACT

An information processing device includes: a processing unit that executes sound processing, the sound processing including at least one of recording electronic meeting information and reproducing the recorded electronic meeting information, the electronic meeting information including sound of an electronic meeting in which a user boarding a mobile body participates; a reception unit that accepts selection of whether or not to set external sound as a target of the sound processing by the preprocessing unit, the external sound being output in the mobile body based on a function different from a function of the electronic meeting; and a processing control unit that causes the processing unit to execute the sound processing in accordance with the selection accepted by the reception unit.

7 Claims, 5 Drawing Sheets

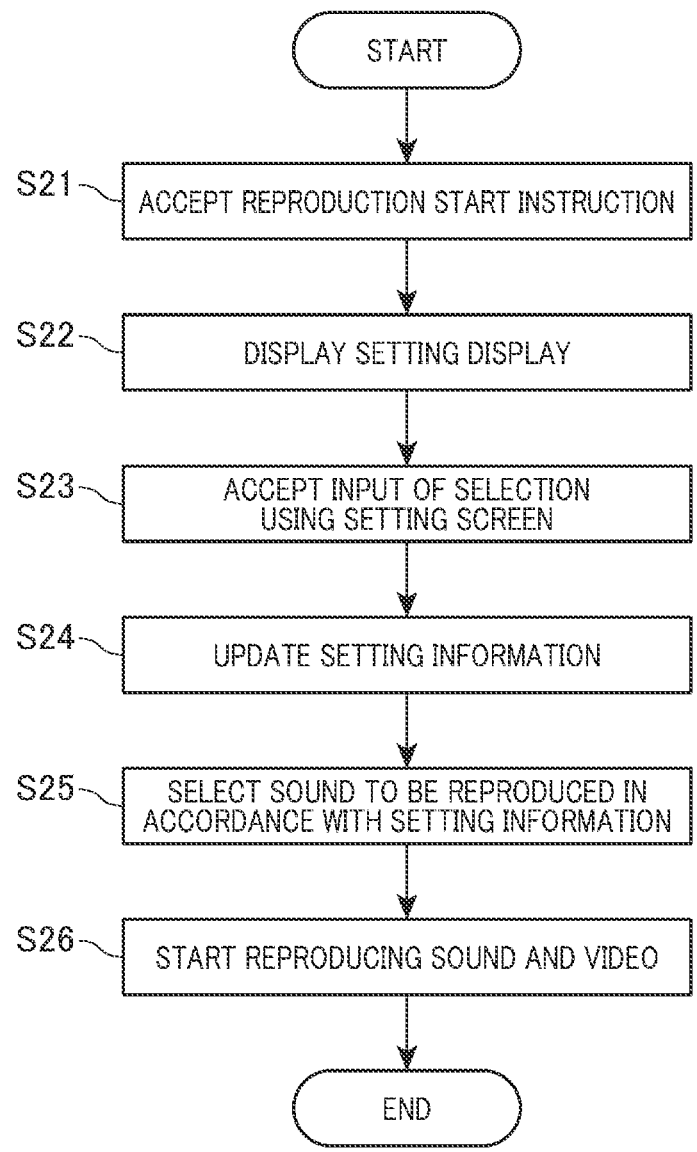

INFORMATION PROCESSING DEVICE, INFORMATION PROCESSING METHOD, AND STORAGE MEDIUM

INCORPORATION BY REFERENCE

The present application claims priority under 35 U.S.C. § 119 to Japanese Patent Application No. 2023-040953 filed on Mar. 15, 2023. The content of the application is incorporated herein by reference in its entirety.

BACKGROUND OF THE INVENTION

Field of the Invention

The present invention relates to an information processing device, an information processing method, and a storage medium.

Description of the Related Art

In recent years, there is an increased effort to provide access to sustainable transportation systems in consideration of even those vulnerable, such as the elderly, people with disabilities, and children, among traffic participants. In order to achieve this goal, research and development efforts are made for further improvement in traffic safety and convenience through development related to comfortability in a vehicle.

For example, Japanese Patent Laid-Open No. 2021-047501 discloses a configuration in which a meeting facility is provided in a mobile body and a user in the mobile body can conduct a meeting using communication.

Incidentally, recording voice and video of an electronic meeting is known as utilization of the electronic meetings. However, when a user is boarding a mobile body, sound may be output by the functions of the mobile body that are different from the function of the electronic meeting. Examples of the sound of this type may include voice output by a navigation system that guides the route of the mobile body, and warning voice of a warning system mounted on the mobile body. Whether or not to record these sounds together with voice and video of an electronic meeting depends on how the user uses the recorded voice and video. For this reason, when a user boarding a mobile body participates in an electronic meeting, it is required to record the sound of the mobile body as intended by the user.

The present invention has been made in view of the above-stated circumstances and aims at reflecting the intention of a user in the case of processing the sound when the user boards a mobile body and participates in an electronic meeting.

SUMMARY OF THE INVENTION

One aspect of the present invention relates to an information processing device, including: a processing unit that executes sound processing, the sound processing including at least one of recording electronic meeting information and reproducing the recorded electronic meeting information, the electronic meeting information including sound of an electronic meeting in which a user boarding a mobile body participates; a reception unit that accepts selection of whether or not to set external sound as a target of the sound processing by the preprocessing unit, the external sound being output in the mobile body based on a function different from a function of the electronic meeting; and a processing control unit that causes the processing unit to execute the sound processing in accordance with the selection accepted by the reception unit.

Advantageous Effects of Invention

The one aspect of the present invention makes it possible to reflect the intention of a user in the case of processing the sound when the user boards the mobile body and participates in an electronic meeting.

BRIEF DESCRIPTION OF THE DRAWINGS

FIG. 5 is a flowchart showing an operation example of the information processing device.

DETAILED DESCRIPTION OF THE PREFERRED EMBODIMENTS

[1. Arrangement of Devices in Vehicle]

Figure 1:
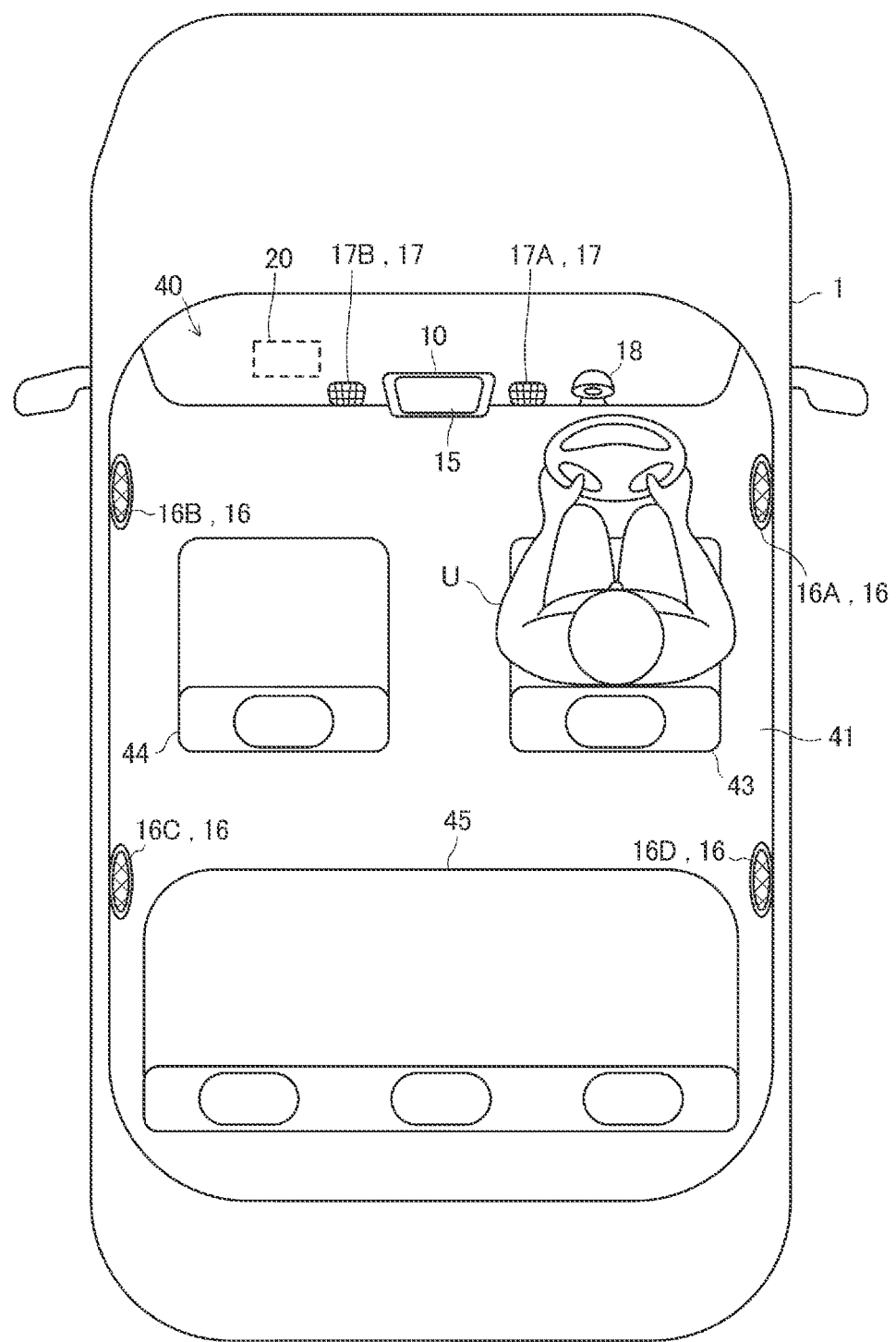
FIG. 1 shows an arrangement example of devices included in a vehicle.

FIG. 1 shows an arrangement example of devices included in a vehicle 1.

The vehicle 1 is an example of "mobile body". The vehicle 1 may include a cabin (a compartment) for a user U to board. The "mobile body" is not limited to four-wheel vehicles and may be a vehicle with five or more wheels or a vehicle with three or less wheels. The vehicle as the "mobile body" may be a large vehicle such as buses, a commercial vehicle, or a work vehicle. The mobile body may also be a land mobile body such as automobiles, as well as a marine mobile body such as ships and submersibles, an aircraft including an electric vertical take-off and landing aircraft (eVTOL), an aerial mobile body such as airships, or a space mobile body such as space crafts and satellites.

The user U is the person boarding the vehicle 1 and participates in an electronic meeting while boarding the vehicle 1. The user U may be a driver steering the vehicle 1 or an occupant riding on the vehicle 1 steered by a person other than the user U.

A vehicle cabin 41 of the vehicle 1 includes a driver seat 43 to be seated by the driver. In the vehicle cabin 41, a passenger seat 44 and a rear part 45 are arranged as the seats seated by persons other than the driver, though these seats are not essential. In the present embodiment, an example will be described in which the user U, who sits on the driver seat 43 and steers the vehicle 1, participates in an electronic meeting.

The vehicle 1 is provided with an information processing device 10. As described later, the information processing device 10 is a device that displays video or outputs voice related to an electronic meeting in response to the operation by the user U. The information processing device 10 is connected to a touch panel 15. In a configuration example shown in FIG. 1, the information processing device 10 is integrated with the touch panel 15, though the information processing device 10 and the touch panel 15 may be configured separately.

The touch panel 15 includes a display screen, constituted of a liquid crystal display panel or an organic electro luminescence (EL) display panel, and a touch sensor arranged so as to be superimposed on the display screen. The information processing device 10 outputs display data to the touch panel 15. The touch panel 15 displays text and images on the display screen based on the display data output by the information processing device 10. The touch panel 15 is arranged at a position within reach of the hand of the user U, who sits on the driver seat 43. For example, the touch panel 15 is provided on a dashboard 40 of the vehicle 1 as shown in FIG. 1. The touch panel 15 detects a touch operation by the user U to the display screen, specifies an operation position of the detected touch operation, and outputs data indicating the specified operation position. The touch panel 15 functions as a display device that displays on the display screen and also as an input device that accepts input by the touch operation.

The vehicle cabin 41 is provided with speakers 16. The speakers 16 output sound based on a sound signal output by the information processing device 10. FIG. 1 shows an example of four speakers 16A, 16B, 16C and 16D provided in the vehicle cabin 41, though there is no limit to the number of the speakers 16 provided in the vehicle 1.

The vehicle cabin 41 is provided with microphones 17. FIG. 1 shows an example of two microphones 17A and 17B in the vehicle cabin 41, though there is no limit to the number of the microphones 17 provided in the vehicle 1. In the following description, the speakers 16A, 16B, 16C, and 16D are referred to as the speakers 16 when they are not distinguished from each other, and the microphones 17A and 17B are referred to as the microphones 17 when they are not distinguished from each other.

The vehicle cabin 41 is provided with a camera 18. The camera 18 is a digital camera that photographs an occupant boarding the vehicle 1 and outputs photographed image data. In FIG. 1, the camera 18 is provided at a position to photograph the user U seated in the driver seat 43, and photographed image data including an image of the face of the user U is output to the information processing device 10. There is no limit to the number of the cameras 18 provided in the vehicle 1 and to a photographing range of the camera 18.

The vehicle 1 is mounted with a vehicle function part 20. The vehicle function part 20 is a device different in function from the information processing device 10. The vehicle function part 20 is a device that implements the function separately from the information processing device 10, and outputs voice based on the function of the vehicle function part 20. The vehicle function part 20 may be provided in the dashboard 40 as shown in FIG. 1, or may be housed in a housing that is integrated with the information processing device 10. A specific configuration of the vehicle function part 20 can be changed as needed in accordance with the specifications, or the like, of the vehicle 1. In the present embodiment, a navigation system 21 (FIG. 2) and an advanced driver-assistance system (ADAS) 22 (FIG. 2) are illustrated as examples of the vehicle function part 20.

[2. Configuration of Information Processing Device]

Figure 2:
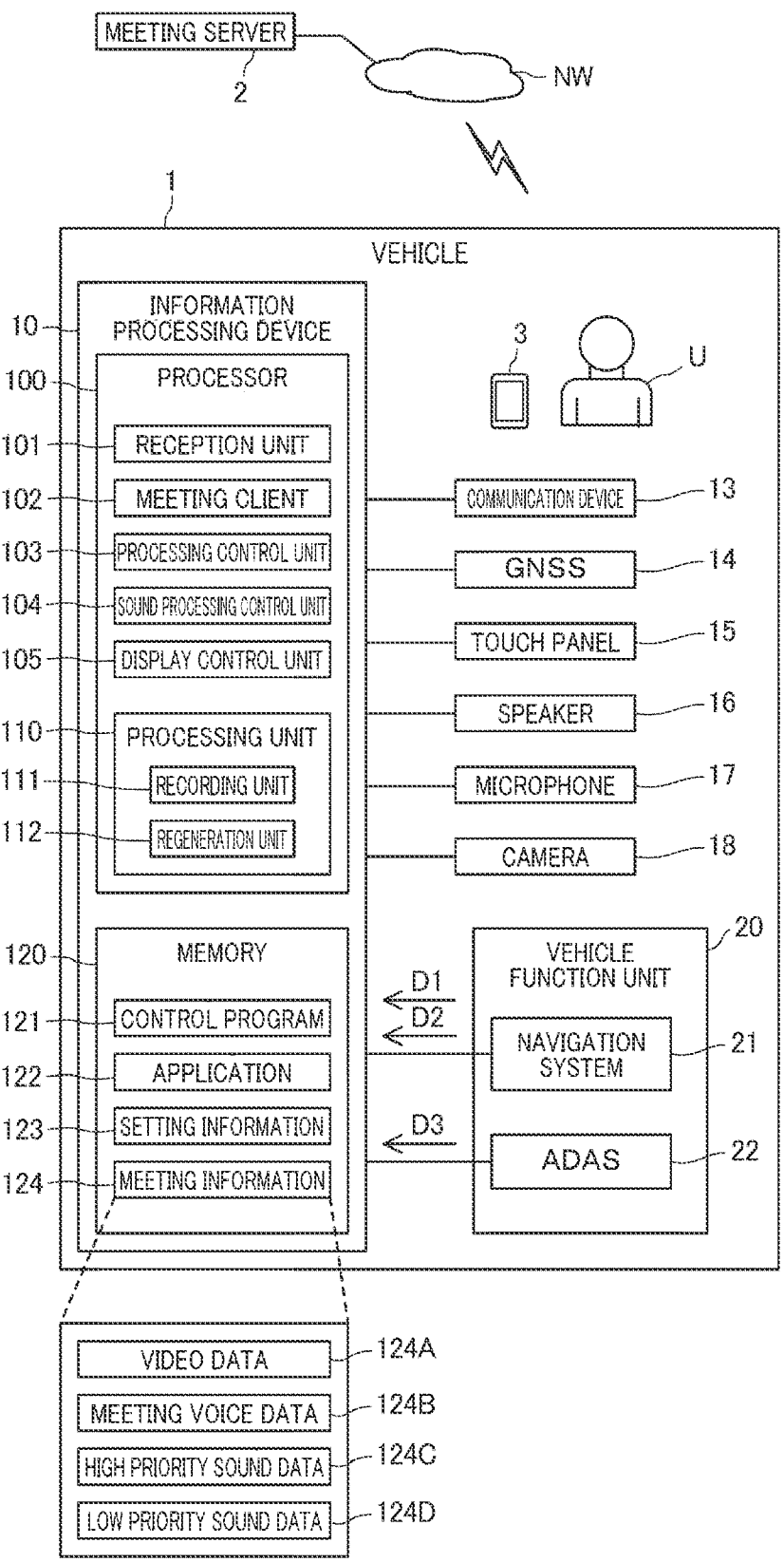
FIG. 2 is a block diagram showing a configuration example of an information processing device.

FIG. 2 is a block diagram showing a configuration example of the information processing device 10. FIG. 2 illustrates, together with the information processing device 10, various devices that are mounted on the vehicle 1 and connected to the information processing device 10.

The information processing device 10 is connected to a communication device 13, a global navigation satellite system (GNSS) 14, the touch panel 15, the speakers 16, the microphones 17, and the camera 18, which are mounted on the vehicle 1. These devices may be provided in the same housing as the information processing device 10. The information processing device 10 is connected to the vehicle function part 20. The vehicle function part 20 includes the navigation system 21 and the ADAS 22.

The vehicle 1 is connected to a meeting server 2 via a communication network NW. The communication network NW is constituted of, for example, a public line network, a dedicated line, or other communication circuits.

The meeting server 2 is a computer that executes an electronic meeting in which a plurality of users including the user U participate. The electronic meeting, also called an online meeting, is a meeting that is executed by meeting participants using computers (hereinafter referred to as participant terminals) to share voices and information through the communication network NW. The meeting server 2 accepts participation in the electronic meeting through the participant terminals in response to access from the participant terminals registered as meeting participants. The meeting server 2 receives voice data from the participant terminals of the users who are meeting participants and generates voice data on the electronic meeting based on the received voice data. The voice data on the electronic meeting is voice data obtained by superimposing or collecting the voices of the users participating in the electronic meeting. The meeting server 2 also receives video data from the participant terminals and generates video data on the electronic meeting based on the received video data. The video data on the electronic meeting is, for example, the video in which the photographed images of the users participating in the electronic meeting are arranged so as to be fit into the same screen. The video data on the electronic meeting may include user images indicating the users instead of the photographed images of the users. For example, the user images are previously prepared illustrations, icons, or other still images. The user images may also be images having the names of the users, who are the meeting participants, being superimposed thereon. The user images may be so-called avatar images that are different from real photographed images. In the case of using the user images, the information processing device 10 may transmit image data on the user images to the meeting server 2 instead of the photographed image data, or the meeting server 2 may have user images corresponding to the respective participants.

FIG. 2 shows a user terminal 3 used by the user U. The user terminal 3 is a smartphone, a tablet computer, or a computer of other forms, and includes a wireless communication device having at least one of the function to communicate with the information processing device 10 and the function to communicate with the meeting server 2. In the embodiment described below, an example is described in which the user U participates in an electronic meeting using the information processing device 10, though the user U may access the meeting server 2 using the user terminal 3 and participate in the electronic meeting.

The communication device 13 is a wireless communication device including a transmitter that transmits data and a receiver that receives data to perform cellular communication. The communication device 13 connects to the communication network NW under the control of a processor 100 and performs data communication with the meeting server 2 through the communication network NW. The communication device 13 may execute wireless communication with the user terminal 3 directly or through the communication network NW. The communication device 13 may be configured to directly communicate with the user terminal 3 by Bluetooth (registered trademark), Wi-Fi (registered trademark), or other short-range wireless communication schemes.

The GNSS 14 detects the position of the vehicle 1 by receiving signals from satellites, generates the position information on the vehicle 1, and outputs the position information to the information processing device 10.

As mentioned above, the touch panel 15 includes a display screen and a touch sensor to display text and images on the display screen under the control of the information processing device 10. The touch panel 15 detects a touch operation on the display screen by the user U, specifies an operation position of the detected touch operation, and outputs data indicating the specified operation position to the information processing device 10.

The vehicle function part 20 is a function part that outputs sound in the vehicle 1. The vehicle function part 20 may be a device that outputs sound based on the function different from the function of the electronic meeting, and its specific form is not restricted. In the present embodiment, the case where the vehicle function part 20 includes the navigation system 21 and the ADAS 22 is shown as an example.

The navigation system 21 and the ADAS 22 are, for example, hardware having a processor different from the processor 100. The navigation system 21 and the ADAS 22 include, for example, an electronic control unit (ECU) provided in the vehicle 1 in addition to the information processing device 10.

The navigation system 21 searches for a moving route along which the vehicle 1 moves and guides the moving route while the vehicle 1 is moving. The navigation system 21 searches for the moving route of the vehicle 1 based on the destination of the vehicle 1 and on the position information on the vehicle 1 generated by the GNSS 14. The position information by the GNSS 14 is input into the navigation system 21 via the information processing device 10, for example. The navigation system 21 may be configured with the GNSS 14. The navigation system 21 stores map data for route guidance in an unillustrated storage device included in the navigation system 21. The navigation system 21 uses the map data to search and guide the moving route.

The navigation system 21 displays on the touch panel 15 a navigation screen including a map and an image showing the current position of the vehicle 1, during execution of the route guidance. Specifically, the navigation system 21 generates display data D1 for displaying the navigation screen and outputs the display data D1 to the information processing device 10. The navigation system 21 also generates voice data D2 to output navigation voice and outputs the voice data D2 to the information processing device 10. The navigation voice is used to inform the user U of an advancing direction of the vehicle 1, the position to turn the vehicle 1 right or left, traffic rules, distance to the destination, and the like.

The ADAS 22 performs processing to assist the user U to steer the vehicle 1. The ADAS 22 detects the surrounding situation of the vehicle 1 and provides notification to the user U based on the detection result, for the purpose of guidance, calling attention, warning, or the like. The notification made by the ADAS 22 includes output of voice and warning sound from the speakers 16. The ADAS 22 generates sound data D3 to output notification voice and warning sound, and outputs the sound data D3 to the information processing device 10. During notification, the ADAS 22 may display text and images for notification on the touch panel 15.

The ADAS 22 has a collision avoidance function, for example. In the case of executing the collision avoidance function, the ADAS 22 uses unillustrated radar sensors, cameras, ultrasonic sensors, and the likes, to detect obstacles in a travel direction of the vehicle 1 or in any other direction. The ADAS 22 estimates the distance between an obstacle and the vehicle 1 and issues an attention calling notification or a warning notification to the user U when there is a possibility that the vehicle 1 collides with the obstacle. The ADAS 22 may have the function of operating a braking device of the vehicle 1. In this case, the ADAS 22 decelerates or stop the vehicle 1 by activating the braking device of the vehicle 1, provided that the collision avoidance function determines that vehicle 1 may make contact with an obstacle.

The ADAS 22 has a lane detection function, for example. In the case of executing the lane detection function, the ADAS 22 uses unillustrated cameras to detect a relative position between a lane of a road where the vehicle 1 is traveling and the vehicle 1. The ADAS 22 provides an attention calling notification or a warning notification to the user U when the vehicle 1 crosses the lane or the vehicle 1 may possibly cross the lane. The ADAS 22 may have the function of operating a steering device of the vehicle 1. In this case, the ADAS 22 operates the steering device of the vehicle 1 to make the vehicle 1 travel at a position corresponding to the lane, provided that the lane detection function determines that vehicle 1 may possibly cross the lane.

The ADAS 22 has a preceding vehicle follow-up function, for example. In the case of executing the preceding vehicle follow-up function, the ADAS 22 uses unillustrated radar sensors, cameras, ultrasonic sensors, and the likes, to detect a preceding vehicle positioned in the travel direction of the vehicle 1. The ADAS 22 operates a throttle device and the braking device of the vehicle 1 to regulate travel speed of the vehicle 1 in order to maintain an appropriate distance between the preceding vehicle and the vehicle 1.

The functions of the ADAS 22 described in the present embodiment are merely exemplary, and the ADAS 22 may have the function to assist the driver in steering the vehicle 1. The ADAS 22 may also have at least some of the above-mentioned functions and provide notification by outputting sound from the speakers 16.

The information processing device 10 includes the processor 100 and a memory 120. The processor 100 is a computer constituted of a central processing unit (CPU), a micro processing unit (MPU), or other integrated circuits. The memory 120 is a storage device that stores programs and data. The processor 100 may use a volatile random access memory (RAM) as a work area. The RAM may be integrated into and mounted on the processor 100 or the memory 120 may be configured with the RAM.

The memory 120 is a rewritable nonvolatile storage device that stores programs executed by the processor 100, and data processed by the processor 100. The memory 120 is constituted of, for example, a semiconductor storage device, such as flash read only memories (ROMs) or solid state disks (SSDs), or a magnetic storage device.

The memory 120 stores a control program 121, application 122, setting information 123, and meeting information 124.

The control program 121 and the application 122 are programs executed by the processor 100 and are stored in the memory 120 so as to be readable by the processor 100. The control program 121 is a basic control program for the processor 100 to control each unit of the information processing device 10, and is also an operating system (OS). The application 122 is an application program executed on the OS.

The processor 100 includes, as function units, a reception unit 101, a meeting client 102, a processing control unit 103, a sound processing control unit 104, a display control unit 105, and a processing unit 110. These function units are implemented by the processor 100 executing programs. Specifically, the reception unit 101, the sound processing control unit 104, and the display control unit 105 are configured when the processor 100 executes the control program 121. The meeting client 102, the processing control unit 103, and the processing unit 110 are configured when the processor 100 executes the application 122. The application 122 is an example of "program".

The reception unit 101 accepts input operation performed by a person boarding the vehicle 1. The reception unit 101 accepts, for example, the content that is input by touch operation on the touch panel 15. The reception unit 101 may accept input operation based on the data that the communication device 13 receives from the user terminal 3.

The meeting client 102 is connected to the meeting server 2 as a participant terminal of the electronic meeting through the communication device 13. The meeting client 102 transmits photographed image data output from the camera 18 and sound data collected by the speakers 16 to the meeting server 2. The meeting client 102 receives data including the sound and video of the electronic meeting that are transmitted by the meeting server 2. The meeting client 102 generates the sound of the electronic meeting based on the data received from the meeting server 2, and outputs the generated sound data to the sound processing control unit 104. The meeting client 102 also generates the video of the electronic meeting based on the data received from the meeting server 2, and outputs the generated video data to the display control unit 105. The meeting client 102 may execute processing to log in to the meeting server 2 with the account of the user U, who is a participant of the electronic meeting.

The sound processing control unit 104 performs processing including the output of sound by the speakers 16 and the collection of sound by the microphones 17. For example, the sound processing control unit 104 acquires sound data, generates a voice signal based on the acquired data, and outputs the generated voice signal to the speakers 16, so that the sound is output from the speakers 16. The sound processing control unit 104 may output different sounds from the respective speakers 16A, 16B, 16C, and 16D. The data acquired by the sound processing control unit 104 includes, for example, data on the sound output by the meeting client 102, data on the sound output by the processing unit 110, and data on the sound input from the vehicle function part 20.

The sound processing control unit 104 also generates, for example, data on the sound collected by the microphones 17 and outputs the generated data to the meeting client 102 and to the processing unit 110.

The display control unit 105 acquires the data for display, generates display data based on the acquired data, and outputs the display data to the touch panel 15. The data acquired by the display control unit 105 includes video data output by the meeting client 102, video data output by the processing unit 110, and video data input from the vehicle function part 20. The display control unit 105 outputs the display data to the processing unit 110.

The processing unit 110 includes a recording unit 111 and a reproduction unit 112. The processing control unit 103 causes the recording unit 111 so that the recording unit 111 records the video that is displayed on the touch panel 15 while the user U participates in the electronic meeting, and the voice that is output from the speakers 16 while the user U participates in the electronic meeting. The recording unit 111 records in accordance with the control of the processing control unit 103. Specifically, the recording unit 111 acquires the sound collected by the microphones 17 and the video displayed on the touch panel 15 during implementation of the electronic meeting, generates meeting information 124 including the sound and video, and stores the meeting information 124 in the memory 120. The processing control unit 103 also causes the reproduction unit 112 to reproduce the meeting information 124 stored in the memory 120. In accordance with the control of the processing control unit 103, the reproduction unit 112 displays the video included in the meeting information 124 on the touch panel 15, and outputs the sound included in the meeting information 124 from the speakers 16. The meeting information 124 is an example of "electronic meeting information". The processing of the processing unit 110 recording the meeting information 124 and the processing of the processing unit 110 reproducing the meeting information 124 correspond to an example of "sound processing".

The sound in the electronic conference includes the voice spoken by the user U during implementation of the electronic meeting and the voice based on the data transmitted from the meeting server 2 to the information processing device 10. The voice spoken by the user U is collected by the microphones 17. Since the voice based on the data transmitted from the meeting server 2 to the information processing device 10 is output from the speakers 16, the information processing device 10 can collect the voice with the microphones 17. In this way, the recording unit 111 uses the microphones 17 to record the sound of the electronic meeting.

The sound collected by the microphones 17 includes the sound different from the voice of the electronic meeting. For example, the speakers 16 output the voice based on the voice data D2 output by the navigation system 21. For example, the speakers 16 also output the sound based on the sound data D3 output by the ADAS 22. These sounds are included in the sound collected by the microphones 17. When the recording unit 111 records all the sounds collected by the microphones 17, the voice based on the voice data D2 and the sound based on the sound data D3 are also included in the meeting information 124.

While the voice based on the voice data D2 and the sound based on the sound data D3 are less relevant to the content of the electronic meeting, they are useful as information about the travel state of the vehicle 1. From this point of view, it is significant that the voice based on voice data D2 and the sound based on the sound data D3 are included in the meeting information 124. Meanwhile, when recording the contents of the electronic meeting is prioritized, it is preferable not to include the voice based on the voice data D2 or the sound based on the sound data D3 in the meeting information 124, in recording the voice of the electronic meeting. Therefore, in recording the electronic meeting, it is appropriate to conform to the intention of the user regarding whether or not the vehicle function part 20 records the sound or voice output from the speakers 16 based on the function different from the function of the electronic meeting.

The information processing device 10 has a function to reproduce the meeting information 124 recorded by the recording unit 111 by using the reproduction unit 112. In reproducing the meeting information 124, it is appropriate, as in the case of recording, to conform to the intention of the user regarding whether or not to reproduce the sound or voice output from the speakers 16 based on the function different from the function of the electronic meeting.

As shown in FIG. 2, the meeting information 124 can include video data 124A, meeting voice data 124B, and high priority sound data 124C, and low priority sound data 124D. The video data 124A is the data obtained by recording the video displayed on the touch panel 15 in the electronic meeting. The meeting voice data 124B is the data obtained by the recording unit 111 recording the meeting voice. There is no limitation to data formats of the video data 124A, the meeting voice data 124B, the high priority sound data 124C, and the low priority sound data 124D.

The processing control unit 103 classifies the sound collected by the microphones 17 into the meeting voice, which is the voice uttered by the participant of the electronic meeting, and external sound output based on the function different from the electronic meeting. The meeting voice include the voice of the user U and the voice or voices of the participant or participants different from the user U. In the present embodiment, the external sound includes the sound and the voice output based on the voice data D2 and the sound data D3. The processing control unit 103 further classifies the external sound into high priority sound and low priority sound. The high priority sound includes voice and sound high in priority, urgency, or importance, and examples of the high priority sound include warning sound or attention calling voice output by the ADAS 22. The low priority sound includes voice and sound lower in priority, urgency, or importance than the high priority sound. Here, the voice refers to a human voice and a sound synthesized in imitation of the human voice. Examples of the low priority sound include part of or all of the voices output by the navigation system 21. The high priority sound corresponds to an example of "first external sound", while the low priority sound corresponds to an example of "second external sound".

The reception unit 101 accepts input of the user U to thereby accept selection of whether or not to record the high priority sound and the low priority sound. The reception unit 101 also accepts input of the user U to thereby accept selection of whether or not to reproduce the high priority sound and the low priority sound. In other words, the reception unit 101 accepts the selection of whether or not to set the high priority sound as a target of processing by the processing unit 110, and the selection of whether or not to set the low priority sound as a target of processing by the processing unit 110. When accepting the selection by the user U, the reception unit 101 generates the setting information 123 indicating the content of the accepted selection and stores the setting information 123 in the memory 120.

The processing control unit 103 causes the processing unit 110 to execute processing in accordance with the selection accepted by the reception unit 101. Specifically, when the recording unit 111 records the electronic meeting, the processing control unit 103 identifies whether the sound collected by the microphones 17 is the meeting sound or the high priority sound. The processing control unit 103 refer to the setting information 123. When recording of the high priority sound is selected, the processing control unit 103 causes the recording unit 111 to generate the meeting information 124 including the high priority sound data 124C that is the data on high priority sound, and when not recording the high priority sound is selected, the processing control unit 103 causes the recording unit 111 to generate the meeting information 124 not including the high priority sound data 124C. When recording the low priority sound is selected, the processing control unit 103 causes the recording unit 111 to generate the meeting information 124 including the low priority sound data 124D that is the data on low priority sound, and when not recording the low priority sound is selected, the processing control unit 103 causes the recording unit 111 to generate the meeting information 124 not including the low priority sound data 124D. The processing control unit 103 causes the recording unit 111 to record the meeting voice regardless of the selection content. Therefore, the meeting information 124 constantly includes the meeting voice data 124B.

The processing control unit 103 refers to the setting information 123 when the reproduction unit 112 reproduces the meeting information 124. When reproducing the high priority sound is selected, the processing control unit 103 causes the reproduction unit 112 to reproduce the high priority sound data 124C included in the meeting information 124, and when not reproducing the high priority sound is selected, the processing control unit 103 does not permit reproduction of the high priority sound data 124C. When reproducing the low priority sound is selected, the processing control unit 103 causes the reproduction unit 112 to reproduce the low priority sound data 124D included in the meeting information 124, and when not reproducing the low priority sound is selected, the processing control unit 103 does not permit reproduction of the low priority sound data 124D. The processing control unit 103 causes the reproduction unit 112 to reproduce the meeting voice data 124B regardless of the selection content.

[3. Operation of Information Processing Device]

Figure 3:
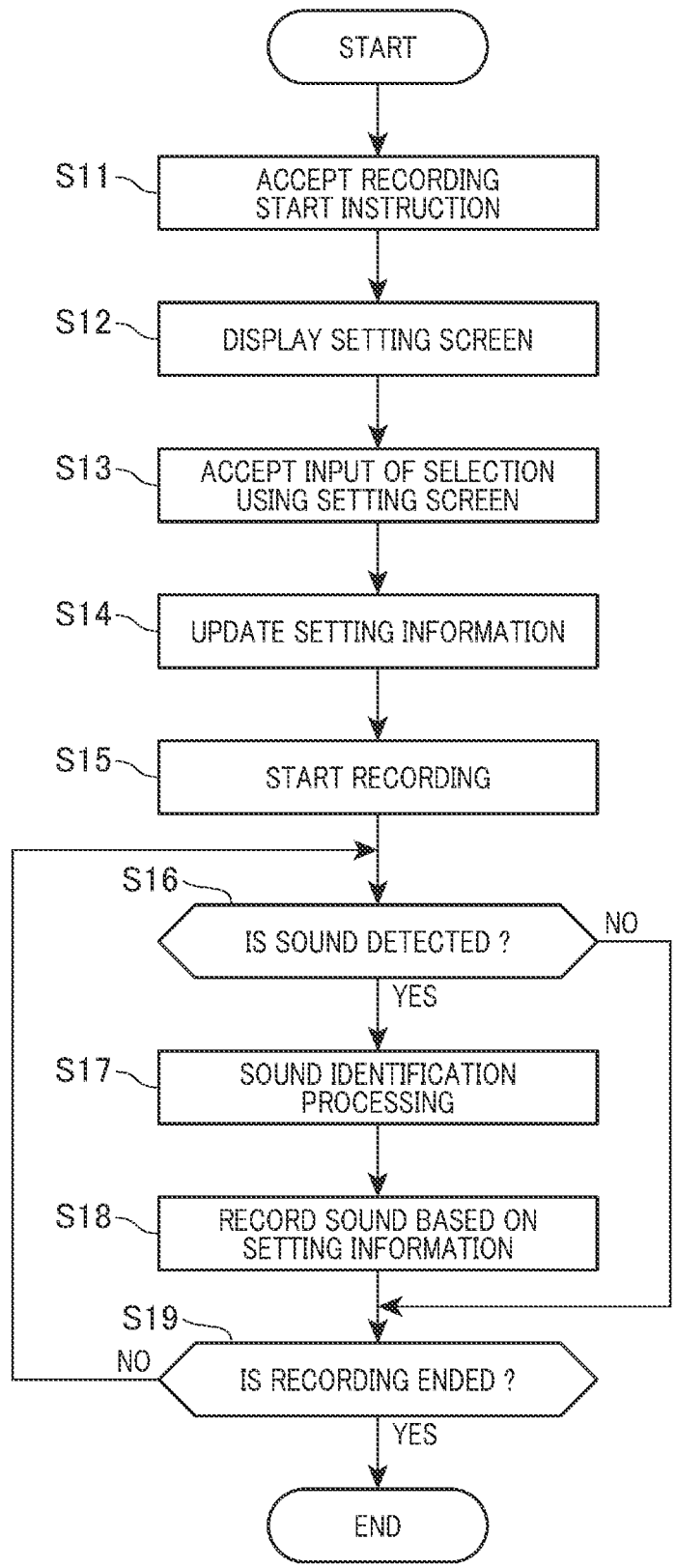
FIG. 3 is a flowchart showing an operation example of the information processing device.
Figure 4:
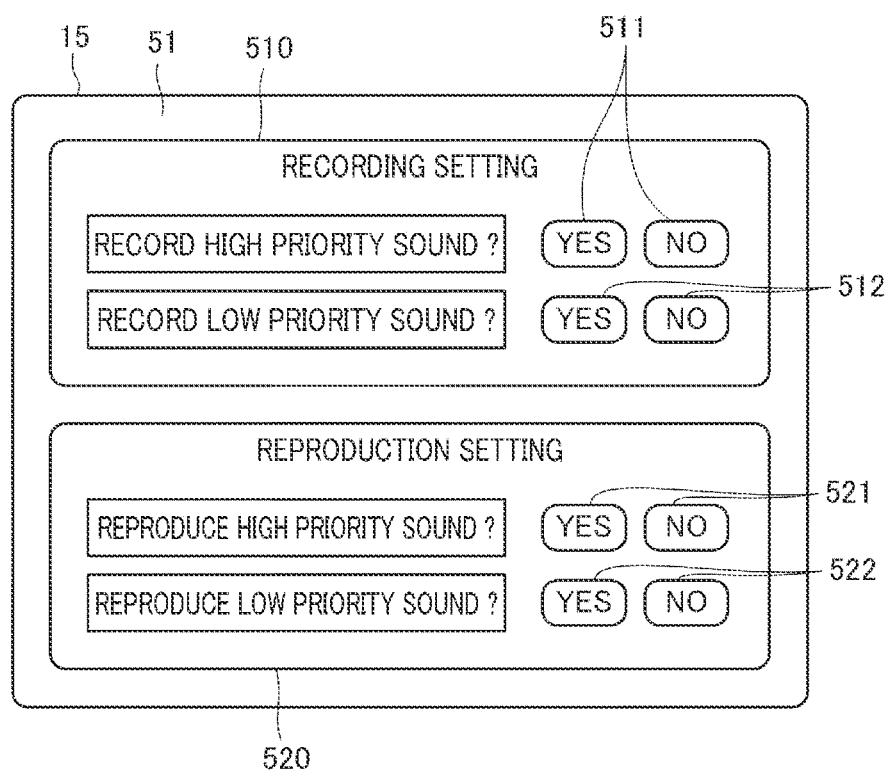
FIG. 4 shows an example of a setting screen.

FIGS. 3 and 5 are flowcharts showing the operation of the information processing device 10. FIG. 3 shows the operation relating to recording by the recording unit 111, and FIG. 5 shows the operation relating to reproduction by the reproduction unit 112. FIG. 4 shows an example of a setting screen 51 displayed under the control of the information processing device 10.

In the operations in FIGS. 3 and 5, steps S11-S14 and S21-S24 are executed by the reception unit 101, and steps S15-S19 are executed by the processing control unit 103 and the recording unit 111. Steps S25-S26 are executed by the processing control unit 103 and the reproduction unit 112.

In the following description, the operation of the information processing device 10 to record and reproduce the video and the voice in the electronic meeting will be described, though recording and reproduction of the video is not essential.

When accepting input of a recording start instruction from the user U (step S11), the information processing device 10 displays the setting screen 51 on the touch panel 15 (step S12). The setting screen 51 is used to select recording and reproduction of the voice that is different from the meeting voice.

As shown in FIG. 4, the setting screen 51 includes a recording setting part 510 and a reproduction setting part 520. In the recording setting part 510, a selection part 511 for selecting whether or not to record high priority sound and a selection part 512 for selecting whether or not to record low priority sound are arranged. In the reproduction setting part 520, a selection part 521 for selecting whether or not to reproduce high priority sound and a selection part 522 for selecting whether or not to reproduce low priority sound are arranged. The selection parts 511, 512, 521, and 522 are buttons for input by touch operation on the touch panel 15.

Back to FIG. 3, the information processing device 10 accepts input of the selection using the setting screen 51 (step S13). The information processing device 10 generates or updates the setting information 123 in accordance with the input content accepted in step S13 (step S14).

The information processing device 10 starts recording video and voice (step S15). The information processing device 10 determines whether or not sound is detected by referring to the data on the sound collected by the microphones 17 (step S16). When no sound is detected (steps S16; NO), the information processing device 10 moves to step S19 described later.

When the sound is detected by the microphones 17 (step S16; YES), the information processing device 10 performs sound identification processing (step S17). The sound identification processing is the processing to identify whether the sound detected by the microphones 17 is the meeting voice, the high priority sound, or the low priority sound.

Specific examples of the sound identification processing include processings 1 to 4.

(Processing 1) The processing control unit 103 specifies a data output source that is the source of the sound output by the sound processing control unit 104 from the speakers 16. In the configuration shown in FIG. 2, the data output source is one of the meeting client 102, the navigation system 21, and the ADAS 22. The processing control unit 103 identifies the sound by specifying the data output source. Specifically, when the data output source is the meeting client 102, the processing control unit 103 identifies the sound detected by microphones 17 as the meeting voice. When the data output source is the navigation system 21, the processing control unit 103 identifies the detected sound as the low priority sound, and when the data output source is the ADAS 22, the processing control unit 103 identifies the detected sound as the high priority sound.

(Processing 2) When outputting the voice data D2 to the information processing device 10, the navigation system 21 outputs control data indicating that the voice data D2 is related to the navigation function to the information processing device 10. The control data may be embedded in the voice data D2 or input into the information processing device 10 separately from the voice data D2. When outputting the sound data D3 to the information processing device 10, the ADAS 22 outputs control data indicating that the sound data D3 is related to the ADAS function to the information processing device 10. The control data may be embedded in the sound data D3 or input into the information processing device 10 separately from the sound data D3. The processing control unit 103 specifies the control data input from the navigation system 21 or the ADAS 22 when the sound is detected by the microphones 17. When the control data is input from the navigation system 21, the processing control unit 103 identifies the detected sound as the low priority sound, and when the control data is input from the ADAS 22, the processing control unit 103 identifies the detected sound as the high priority sound. When the control data is not input from either the navigation system 21 or the ADAS 22, the detected sound is identified as the meeting voice.

(Processing 3) The processing control unit 103 determines the content of the sound detected by the microphones 17. Specifically, the processing control unit 103 determines the content of the sound by pattern matching. For example, the processing control unit 103 performs processing including pattern matching on the sound data detected by the microphones 17 to determine whether or not the detected sound corresponds to known high priority sound and whether or not the detected sound corresponds to known low priority sound. The voice for guidance output by the navigation system 21 and the warning sound output by the ADAS 22 are standardized. Therefore, pattern matching allows determination of the sound detected by the microphones 17 with high accuracy. The sound corresponding to neither the known high priority sound nor the known low priority sound can be determined as the meeting voice.

(Processing 4) The processing control unit 103 determines the content of the sound detected by the microphones 17. Specifically, the processing control unit 103 uses dictionary data for sound determination. When determining that the sound detected by the microphones 17 is human voice or synthesized voice, the processing control unit 103 performs processing to convert the voice into text. The processing control unit 103 collates the converted text with pre-created dictionary data to determine whether or not the detected sound corresponds to the known high priority sound and whether or not the detected sound corresponds to the low priority sound. The dictionary data is stored, for example, in the memory 120. The sound corresponding to neither the known high priority sound nor the known low priority sound can be determined as the meeting voice.

(Processing 5) The processing control unit 103 specifies the direction of the sound output source based on the sound detected by the microphones 17A and 17B. Specifically, the processing control unit 103 compares the volume of the sound detected by the microphone 17A with the volume of the sound detected by the microphone 17B to determine the direction of the output source with reference to the position of the microphone 17A and 17B. When the output source is the driver seat 43, the sound detected by the microphones 17 is the voice uttered by the user U. It is also possible to adopt a configuration in which the high priority sound, the low priority sound, and the meeting voice are output from the different speakers 16. For example, a configuration is possible in which the guide voice of the navigation system 21 is output from the speaker 16A, the warning sound of the ADAS 22 is output from all the speakers 16A, 16B, 16C, and 16D, and the meeting voice of the meeting client 102 is output from the speakers 16A and 16B. In this case, the processing control unit 103 can identify whether the sound detected by the microphones 17 is the meeting voice, the high priority sound, or the low priority sound based on the output source.

Using one of the above processings 1 to 5, the processing control unit 103 identifies the sound detected by the microphones 17. The processing control unit 103 may perform final identification by executing two or more processings, out of the processings 1 to 5, in combination and collating the identification results of each processing.

The processing control unit 103 records the sound in accordance with the identification result of step S16 and the setting information 123 (step S18). The processing control unit 103 generates the meeting voice data 124B, the high priority sound data 124C, or the low priority sound data 124D in step S18, and stores the meeting information 124 including the generated data in the memory 120.

The processing control unit 103 determines whether or not to end recording (step S19). Recording is ended in the case where, for example, end recording is instructed by the operation of the touch panel 15 and in the where the electronic meeting in which the meeting client 102 participates is ended. When recording is not ended (step S19; NO), the processing control unit 103 returns to step S16. When recording is ended (step S19; YES), the processing is ended.

When accepting input of a reproduction start instruction from the user U (step S21 in FIG. 5), the information processing device 10 displays the setting screen 51 on the touch panel 15 (step S22). The information processing device 10 accepts input of the selection using the setting screen 51 (step S23). The information processing device 10 generates or updates the setting information 123 in accordance with the input content accepted in step S23 (step S24). The setting screen 51 is as described with reference to FIG. 4. Steps S22-S24 may be skipped when the memory 120 stores the setting information 123 and the update of the setting information 123 is not required.

The information processing device 10 selects sound data to be reproduced, out of the meeting voice data 124B that is the data on sound included in the meeting information 124, the high priority sound data 124C, and the low priority sound data 124D, in accordance with the setting information 123 (step S25). The information processing device 10 starts to reproduce the sound selected in step S25 and the video data 124A (step S26).

4. Other Embodiments

The embodiment described above shows only one aspect, and any deformations and applications are possible.

In the above embodiment, the case where the information processing device 10 performs recording to record video and sound and reproduces the video and the sound has been described as an example with reference to FIGS. 3 and 5. However, this is merely an example. For example, the information processing device 10 may perform an operation without involving recording and reproduction of the video.

In the above embodiment, an example has been described in which the processing control unit 103 identifies the meeting voice as well as the high priority sound and the low priority sound in processing of the processings 1 to 5. This is merely an example, and the sound output based on functions different from the function of the electronic meeting may be divided into three or more stages, for example.

In the above embodiment, an example has been described in which the sound output by the navigation system 21 is set as the low priority sound and the sound output by ADAS 22 is set as the high priority sound. However, different sound division may be adopted. For example, out of the sounds output by the navigation system 21, more important guidance voice and warning sound may be set as the high priority sound, and less important guidance voice may be set as the low priority sound. Similarly, in the case of the sound output by the ADAS 22, more important warning sound, such as collision warning sound and proximity warning is set as the high priority sound, and less important guidance voice may be set as the low priority sound.

In the above embodiment, an example has been described in which the information processing device 10 accepts the selection based on the touch operation on the touch panel 15 while the setting screen 51 is displayed. The information processing device 10 may accept voice input of the user U using the microphones 17 while the setting screen 51 is displayed. In addition, the information processing device 10 may include an unillustrated sensor that detects a gesture operation of the user U, and may accept the selection by detecting the gesture operation of the user U.

In the embodiment described above, an example has been described in which the information processing device 10, provided in the vehicle 1 and connected to the navigation system 21 and the ADAS 22, runs the meeting client 102 and participates in an electronic meeting as a participant terminal. This is merely an example, and the user terminal 3 may implement the function of the reception unit 101, the meeting client 102, and the processing control unit 103, for example. Specifically, the user terminal 3 may display the setting screen 51 on the display screen of the user terminal 3 and accepts selection of the user U, the user terminal 3 may participate in the electronic meeting as a participant terminal, and the user terminal 3 may executes the processing to record the sound and the processing of reproduction. In this case, the user terminal 3 may include a microphone, a storage device that stores the setting information 123 and the meeting information 124, a display screen, and an input device that accepts input of the user U. In the processing to identify the sound (step S16), the user terminal 3 may execute the processings 3, 4, or 5.

The information processing device 10 may not be fixed to the vehicle 1, and may be a portable device that is temporarily provided in the vehicle 1. For example, the information processing device 10 may be a smartphone, a tablet computer, a personal computer of other formats, a car navigation device, or a display audio device.

The processor 100 may be constituted of a single processor or may be constituted of a plurality of processors. The processor 100 may be hardware programed to implement corresponding function units. Specifically, the processor 100 may be constituted of, for example, an application-specific integrated circuit (ASIC) or a field programmable gate array (FPGA).

Each unit of the vehicle 1 shown in FIG. 2 is exemplary, and specific implementations are not particularly limited. In other words, it is not necessarily needed to implement hardware corresponding individually to each unit, and it is of course possible to adopt the configuration where the function of each unit is implemented by one processor executing a program or programs. In the embodiment described above, some of the functions implemented by software may be implemented by hardware, or some of the functions implemented by hardware may be implemented by software. For other specific detailed configurations regarding each unit of the vehicle 1, any changes are possible.

The operations shown in FIGS. 3 and 5 are divided into step units according to the main processing contents for easy understanding of the operations, and the present invention is not limited by how the operations are divided into processing units or by the name thereof. Depending on the processing contents, the operations may be divided into more step units. The operations may also be divided so that one step unit may include more processings. The order of the steps may be switched as appropriate without compromising the scope of the present invention.

When the control method of the above-described information processing device 10 is implemented by using the processor 100, the program to be executed by the processor 100 may be configured in the format of a non-transitory recording medium or a transmission medium that transmits the program. In other words, the application 122 can be implemented in the state where the application 122 is recorded on a portable information storage medium. Examples of the information recording medium include a magnetic recording medium such as a hard disk, an optical recording medium such as a CD, and a semiconductor storage device such as a universal serial bus (USB) memory and a solid state drive (SSD), though other recording media can also be used.

5. Configurations Supported by Above Embodiment

The embodiment disclosed supports the following configurations.

(Configuration 1) An information processing device includes: a processing unit that executes sound processing, the sound processing including at least one of recording electronic meeting information and reproducing the recorded electronic meeting information, the electronic meeting information including sound of an electronic meeting in which a user boarding a mobile body participates; a reception unit that accepts selection of whether or not to set external sound as a target of the sound processing by the preprocessing unit, the external sound being output in the mobile body based on a function different from a function of the electronic meeting; and a processing control unit that causes the processing unit to execute the sound processing in accordance with the selection accepted by the reception unit.

According to the control device in the configuration 1, in the case of processing the sound of an electronic meeting in which a user boarding a mobile body participates, the user can select whether or not to process the external sound output in the mobile body based on the function different from the function of the electronic meeting. Therefore, it is possible to record or reproduce the sound as intended by the user.

(Configuration 2) The information processing device according to the configuration 1, in which the processing unit includes a recording unit that records the electronic meeting information, the external sound includes first external sound with a high priority, and the reception unit accepts selection of whether or not to set the first external sound as a target of the sound processing by the processing unit.

According to the information processing device in the configuration 2, the user can select whether or not to process the high-priority sound, out of the sounds output from the mobile body, together with the sound of the electronic meeting, so that recording and reproduction of sound can be performed as intended by the user.

(Configuration 3) The information processing device according to the configuration 2, in which the recording unit executes recording of sound collected by a microphone, and the processing control unit identifies whether the sound collected by the microphone is meeting voice uttered by a participant of the electronic meeting or the first external sound, and causes the recording unit to record the meeting voice even when the reception unit accepts selection of not setting the first external sound as the target of the sound processing.

According to the information processing device in the configuration 3, the voice uttered by the user for the meeting can be recorded even when not recording the external sound is the intention of the user. This allows more reliable recording of the electronic meeting.

(Configuration 4) The information processing device in the configuration 3, in which the processing control unit performs at least one processing, out of processing to determine a generation direction of the sound collected by the microphone and processing to determine an output source that has output the external sound, so as to identify whether the sound collected by the microphone is the meeting voice or the first external sound.

According to the information processing device in the configuration 4, it is possible to identify whether the sound collected by the microphone is the meeting voice or the first external sound.

(Configuration 5) The information processing device according to any one the configurations 2 to 4, in which the external sound includes the first external sound and second external sound with a lower priority than the first external sound, and the reception unit accepts selection of whether or not to set each of the first external sound and the second external sound as the target of the sound processing by the processing unit.

According to the information processing device in the configuration 5, the user can select whether or not to set each of the sound with a high priority and the sound with a low priority, which are the external sounds not the electronic meeting sound, as the target of the processing. Therefore, it is possible to better reflect the intention of the user.

(Configuration 6) An information processing method executed by a computer, including: in execution of sound processing including at least one of recording electronic meeting information and reproducing the recorded electronic meeting information, the electronic meeting information including sound of an electronic meeting in which a user boarding a mobile body participates, accepting selection of whether or not to set external sound as a target of the sound processing, the external sound being output in the mobile body based on a function different from a function of the electronic meeting; and executing the sound processing in accordance with the selection.

According to the information processing method in the configuration 6, in the case of processing the sound of an electronic meeting in which a user boarding a mobile body participates, the user can select whether or not to process the external sound output in the mobile body based on the function different from the function of the electronic meeting. Therefore, it is possible to record or reproduce the sound by reflecting the intention of the user.

(Configuration 7) A non-transitory computer-readable storage medium storing a program for causing a computer to function as: a processing unit that executes sound processing, the sound processing including at least one of recording electronic meeting information and reproducing the recorded electronic meeting information, the electronic meeting information including sound of an electronic meeting in which a user boarding a mobile body participates; a reception unit that accepts selection of whether or not to set external sound as a target of the sound processing by the preprocessing unit, the external sound being output in the mobile body based on a function different from a function of the electronic meeting; and a processing control unit that causes the processing unit to execute the sound processing in accordance with the selection accepted by the reception unit.

When the computer executes the program in the configuration 7 in the case of processing the sound of an electronic meeting in which a user boarding a mobile body participates, the user can select whether or not to process the external sound output in the mobile body based on the function different from the function of the electronic meeting. Therefore, it is possible to record or reproduce the sound by reflecting the intention of the user.

REFERENCE SIGNS LIST

1 . . . . Vehicle (mobile body), 2 . . . meeting server, 3 . . . . User terminal, 10 . . . . Information processing device, 13 . . . . Communication device, 14 . . . . GNSS, 15 . . . . Touch panel, 16, 16A, 16B, 16C, 16D . . . Speaker, 17, 17A, 17B . . . Microphone, 18 . . . . Camera, 20 . . . . Vehicle function part, 21 . . . . Navigation system, 22 . . . . ADAS, 40 . . . . Dashboard, 41 . . . . Vehicle cabin, 43 . . . . Driver seat, 44 . . . . Passenger seat, 45 . . . . Rear seat, 51 . . . . Setting screen, 100 . . . . Processor, 101 . . . . Reception unit, 102 . . . . Meeting client, 103 . . . . Processing control unit, 104 . . . . Sound processing control unit, 110 . . . . Processing unit, 111 . . . . Recording unit, 112 . . . . Reproduction unit, 120 . . . . Memory, 121 . . . . Control program, 122 . . . . Application (program), 123 . . . . Setting information,

124 . . . . Meeting information (electronic meeting information), 124A . . . Video data, 124B . . . Meeting voice data, 124C . . . Priority sound data, 124D . . . Priority sound data, D1 . . . Display data, D2 . . . Voice data, D3 . . . Sound data, NW . . . Communication network.

What is claimed is:

1. An information processing device, comprising a processor configured to control:
   a processing unit that executes sound processing, the sound processing including at least one of recording electronic meeting information and reproducing the recorded electronic meeting information, the electronic meeting information including sound of an electronic meeting in which a user boarding a mobile body participates;
   a reception unit that accepts selection of whether or not to set external sound as a target of the sound processing by the preprocessing unit, the external sound being output in the mobile body based on a function different from a function of the electronic meeting; and
   a processing control unit that causes the processing unit to execute the sound processing in accordance with the selection accepted by the reception unit.

2. The information processing device according to claim 1, wherein the processing unit includes a recording unit that records the electronic meeting information, the external sound includes first external sound with a high priority, and the reception unit accepts selection of whether or not to set the first external sound as a target of the sound processing by the processing unit.

3. The information processing device according to claim 2, wherein the recording unit executes recording of sound collected by a microphone, and the processing control unit identifies whether the sound collected by the microphone is meeting voice uttered by a participant of the electronic meeting or the first external sound, and causes the recording unit to record the meeting voice even when the reception unit accepts selection of not setting the first external sound as the target of the sound processing.

4. The information processing device according to claim 3, wherein the processing control unit performs at least one processing, out of processing to determine a generation direction of the sound collected by the microphone and processing to determine an output source that has output the external sound, so as to identify whether the sound collected by the microphone is the meeting voice or the first external sound.

5. The information processing device according to claim 2, wherein the external sound includes the first external sound and second external sound with a lower priority than the first external sound, and the reception unit accepts selection of whether or not to set each of the first external sound and the second external sound as the target of the sound processing by the processing unit.

6. An information processing method executed by a computer, comprising:
   in execution of sound processing including at least one of recording electronic meeting information and reproducing the recorded electronic meeting information, the electronic meeting information including sound of an electronic meeting in which a user boarding a mobile body participates, accepting selection of whether or not to set external sound as a target of the sound processing, the external sound being output in the mobile body based on a function different from a function of the electronic meeting; and executing the sound processing in accordance with the selection.

7. A non-transitory computer-readable storage medium storing a program for causing a computer to function as:
   a processing unit that executes sound processing, the sound processing including at least one of recording electronic meeting information and reproducing the recorded electronic meeting information, the electronic meeting information including sound of an electronic meeting in which a user boarding a mobile body participates;
   a reception unit that accepts selection of whether or not to set external sound as a target of the sound processing by the preprocessing unit, the external sound being output in the mobile body based on a function different from a function of the electronic meeting; and
   a processing control unit that causes the processing unit to execute the sound processing in accordance with the selection accepted by the reception unit.

\* \* \* \* \*